United States Patent [19]

Groesch et al.

[11] Patent Number: 4,701,132
[45] Date of Patent: Oct. 20, 1987

[54] DUMMY FOR CAR CRASH TESTING

[75] Inventors: Lothar Groesch; Gabriel Netzer, both of Stuttgart; Lothar Kassing, Nufringen, all of Fed. Rep. of Germany

[73] Assignee: Daimler-Benz Aktiengesellschaft, Stuttgart, Fed. Rep. of Germany

[21] Appl. No.: 825,353

[22] Filed: Feb. 3, 1986

[30] Foreign Application Priority Data

Feb. 2, 1985 [DE] Fed. Rep. of Germany ....... 3503577

[51] Int. Cl.⁴ .............................................. G09B 23/32
[52] U.S. Cl. ..................................... 434/274; 73/866.4
[58] Field of Search ....................... 434/274, 265, 267; 33/DIG. 13; 73/432.1, 862.04, 866.4

[56] References Cited

U.S. PATENT DOCUMENTS

| | | | |
|---|---|---|---|
| 3,757,431 | 9/1973 | Daniel | 434/274 |
| 4,328,621 | 5/1982 | Benjamin | 33/DIG. 13 X |
| 4,409,835 | 10/1983 | Daniel | 434/274 X |

FOREIGN PATENT DOCUMENTS 2358716 2/1978 France .
2449937 9/1980 France .

Primary Examiner—William H. Grieb
Attorney, Agent, or Firm—Barnes & Thornburg

[57] ABSTRACT

This invention relates to an anatomical model, particularly a dummy, for simulating the effect of an accident on the human body. The model is provided with a skeleton. In the area of the thorax, the skeleton is formed by a plurality of spring rib members that simulate human ribs. Each of the spring rib members is equipped with sensor device which senses a force that affects each individual spring rib member.

19 Claims, 2 Drawing Figures

DUMMY FOR CAR CRASH TESTING

BACKGROUND AND SUMMARY OF THE INVENTION

This invention relates to an anatomical model, particularly a dummy, for simulating the effect of an accident on the human body. The model is provided with a skeleton. In the area of the thorax, the skeleton is formed by several pairs of rib-curvature-type leaf springs which, as curved ribs, connect a backbone with a chestplate. The model is equipped with a mechanical-electrical transducer for the measuring of a mechanical quantity.

Occupants of passenger cars involved in accidents frequently suffer rib fractures that are caused by the impact of the upper body on the steering wheel or by an excessive straining of the thorax caused by the seat belt. As a result of these rib fractures, injuries to organs may occur that may be life-threatening.

In order to prevent, if possible, or at least reduce injuries of this type, an attempt is made to investigate the reasons for injuries of this type by means of anatomical models of the human body, so-called dummies, in crash tests. Although these dummies correspond largely to the human body with respect to weight, dimensions and structure, they must be constructed of unbreakable materials, so that they can be used repeatedly. As a result, no injuries can occur. However, in a crash test, mechanical quantities, such as force, accelerations or deformations, can be detected by measuring techniques which permit the drawing of conclusions concerning the extent of the strain on the corresponding part of the body.

Up to now, the dummy's thorax has been considered to be such a part where a measured maximum chest deformation of the dummy is used as a relevant criterion for the risk of injury to the thorax. However, this maximum chest deformation offers only vague clues for a real straining of the ribs because the impact surface and the direction of the blow are also of considerable importance. Thus, for example, the use of a thin nylon rope instead of a safety belt having the conventional width and having the conventional stretching capacity, despite identical chest deformation, resulted in a much higher risk of injury.

An object of this invention is to provide an anatomical model which supplies realistic information on the risk of injury to the human thorax as a result of accidents.

This object is achieved in accordance with a preferred embodiment of the invention by providing an anatomical model having a thorax area in which a plurality of spring rib members or leaf springs which simulate human ribs are disposed. Further, sensor means are provided on each spring rib member for sensing a force applied to each individual spring rib member. Using this arrangement, a deformation path of the spring rib members is transformed into a proportional electrical parameter. The stretching of the spring rib member in the measuring area can be measured and as a result permits exact conclusions concerning the partial stress at this measuring point. The total stressing of the thorax, including the spring rib members, can be obtained from the sum of the individual stresses to the spring rib members.

Further, for advantageously determining the proportions of the frontal and lateral stress to be determined as well, preferred embodiments of the invention provides the skeleton with a front chestplate member and a plurality of pairs of spring rib members disposed on opposite sides of the chestplate. At least one sensor means is provided on each of the spring rib members of each pair.

Other advantageous features are achieved in preferred embodiments in which the sensor means include a mechanical-electrical transducer for changing the deformation path of the spring rib members into a proportional electrical parameter.

Further advantageous features are achieved in preferred embodiments in which the sensor means is a measured value sensor and comprises a strain gauge.

Other advantageous features are achieved in preferred embodiments including a back plate to which the spring rib members are attached. In this preferred embodiment, the sensor means are attached near the back plate member.

Further objects, features, and advantages of the present invention will become more apparent from the following description when taken with the accompanying drawings which show, for purposes of illustration only, several embodiments in accordance with the present invention.

DETAILED DESCRIPTION OF THE DRAWINGS

Figure 1:
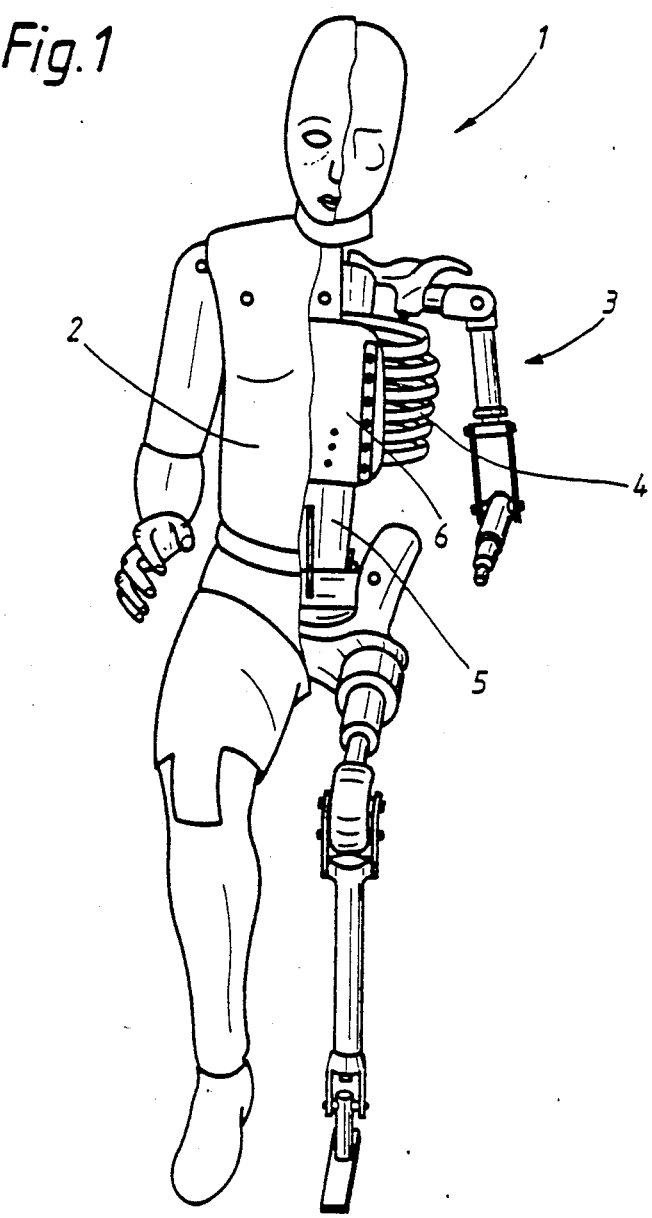
FIG. 1 is a front view of an anatomical model of the human body constructed in accordance with a preferred embodiment of the invention, in which the left side of the model has an outer shell removed exposing a skeleton on the interior of the body to facilitate the illustration.

The anatomical model according to FIG. 1 relates to a so-called test dummy 1 that is suitable for simulating the effect of an accident on the human body. The dummy 1 corresponds to the so-called average person with respect to its weight, its proportions and its structure, so that in crash tests basic conclusions can be drawn on the risk of injury to the human body. In the figure illustration, the dummy 1 is shown as cut in the median plane so that its interior structure is visible in the right half of the drawing. The skin and muscle tissue is simulated by an elastic outer shell 2 which is visible in the right half (left side of FIG. 1) of the dummy's body.

Figure 2:
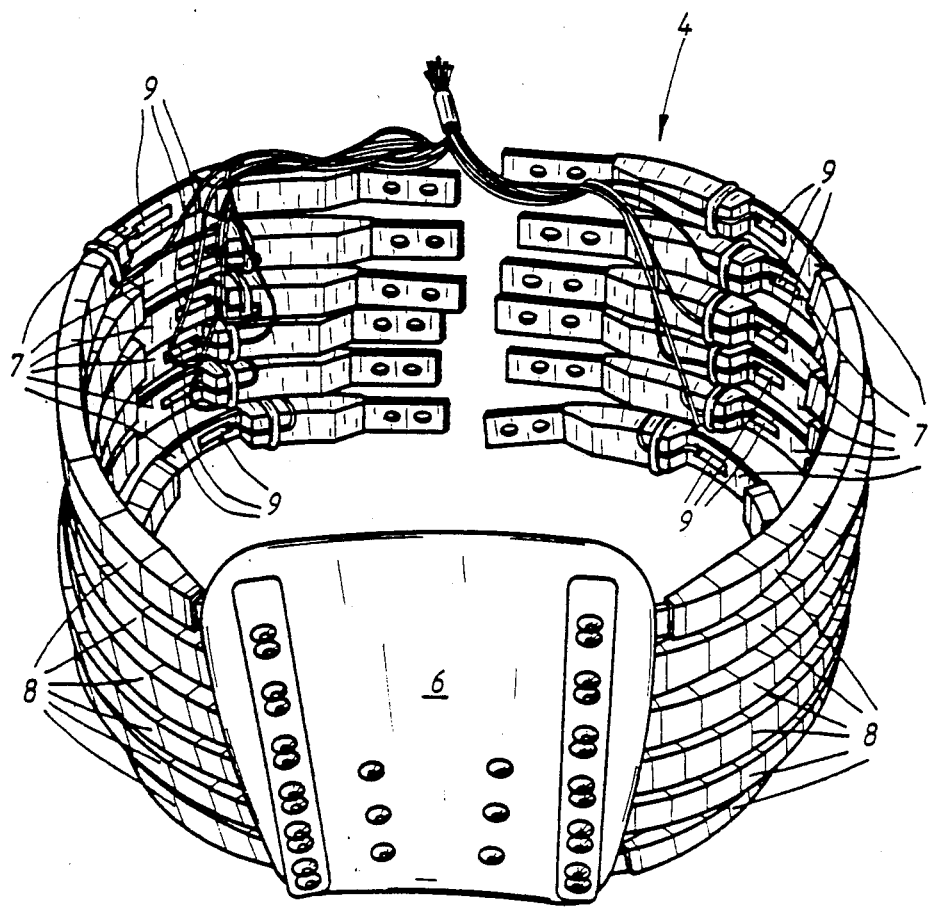
FIG. 2 is a front view of an interior thorax area of the model shown in FIG. 1.

In order to achieve a mobility of the dummy 1 that can be compared to the human body, a skeleton 3 made of machine elements is provided as shown on the left side (right side of FIG. 1) of the body. In the preferred embodiment, a thorax 4 is rigidly connected with a backbone 5. The thorax 4 is shown in enlarge detail in FIG. 2 and is described in detail as follows. The thorax 4 is formed by six pairs of spring rib curvatures lined up in different planes transverse to the vertical axis of the body, and the pairs of spring rib curvatures are ventrally connected with one another via a chest or breast plate 6. The left and the right spring rib curvatures are made of leaf springs 7 that are surrounded by a casing 8. The leaf springs 7 can be fastened at the backbone 5 with their free ends. In the dorsal area of the spring rib curvatures, a short segment is cut out of the casing 8 so that the leaf springs 7 are directly accessible in this area. A strain gauge 9 is glued on an interior circumference of each leaf spring 7 in this exposed segment. Each of the strain gauges 9 is connected to a resistance-measuring device via one cable. By means of this measuring arrangement, the force affecting each individual spring rib curvature can be determined by transforming the deformation path of the respective leaf spring 7 into a proportional electrical parameter.

By means of the differentiated measurement of the individual rib strains in crash tests, it becomes possible for the first time to investigate different restraining systems, such as seat belts and air bags, in a comparative way with respect to the risk of injury in the form of rib fractures during accidents.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. An anatomical model for simulating the effect of an accident on a human body comprising:
   a skeleton member having a thorax area;
   a front plate member disposed in said thorax area;
   a plurality of pairs of spring rib members simulating human ribs, each pair of spring rib members being disposed on opposite sides of said front plate member, each pair of spring rib members including a back spine area opposite said front plate member; and
   a plurality of sensor means, each of said pairs of spring rib members including at least one separate sensor means attached thereto near said back spine area for sensing a force applied to each individual pair of spring rib members.

2. An anatomical model as in claim 1, wherein said back spine area includes a central line substantially transverse to said plurality of pairs of spring rib members, each of said pairs of spring rib members including at least one separate sensor means attached thereto on each side of said central line.

3. An anatomical model as in claim 2, including a back plate member, said pairs of spring rib members connecting said back plate member to said front plate member.

4. An anatomical model as in claim 3, wherein said sensor means comprises mechanical-electrical transducer means for changing a deformation path of said spring rib members into a proportional electrical parameter.

5. An anatomical model as in claim 2, wherein said sensor means is a measured-value sensor and comprises a strain gauge.

6. An anatomical model as in claim 5, wherein the measured-value sensors are disposed in an area near said back plate member.

7. An anatomical model as in claim 4, wherein said sensor means includes a sensor means attached to each spring rib member of each pair of spring rib members.

8. An anatomical model as in claim 7, wherein said sensor means is a measured-value sensor and comprises a strain gauge.

9. An anatomical model as in claim 6, wherein the measured-value sensors are disposed in an area near said back plate member.

10. And anatomical model as in claim 3, wherein said back plate member includes a first and a second side substantially transverse to the plurality of said pairs of spring rib members, said at least one separate sensor means being attached to each of said pairs of spring rib members near said back plate member on each of said first and second sides of said back plate member.

11. An anatomical model for simulating the effect of an accident on a human body comprising:
    a skeleton member having a thorax area;
    a plurality of spring rib members simulating human ribs disposed in said thorax area, said rib members including a back spine area; and
    a plurality of sensor means, each of said spring rib members including at least one separate sensor means attached thereto near said back spine area for sensing a force applied to each individual spring rib member.

12. An anatomical model as in claim 11, wherein said back spine area includes a central line substantially transverse to said plurality of spring rib members, each of said spring rib members including at least one separate sensor means attached thereto on each side of said central line.

13. An anatomical model as in claim 12, wherein said sensor means comprises a mechanical-electrical transducer means for changing a deformation path of said spring rib members into a proportional electrical parameter.

14. An anatomical model as in claim 13, wherein said sensor means is a measured-value sensor and comprises a strain gauge.

15. An anatomical model as in claim 12, including a back plate member to which said spring rib members are attached.

16. An anatomical model as in claim 15, wherein said sensor means comprises a mechanical-electrical transducer means for changing deformation path of said spring rib members into a proportional electrical parameter.

17. An anatomical model as in claim 16, wherein said sensor means is a measure-value sensor and comprises a strain gauge.

18. An anatomical model as in claim 17, wherein the measured-value sensors are disposed in an area near said back plate member.

19. An anatomical model as in claim 12, wherein said back plate member includes a first and a second side substantially transverse to the plurality of spring rib members, said at least one separate sensor means being attached to each of said spring rib members near said back plate member on each of said first and second sides of said back plate member.

* * * * *